United States Patent

[11] 3,572,462

[72] Inventor Joseph C. Gray
 4131 Turnberry Circle, Houston, Tex. 77025
[21] Appl. No. 789,558
[22] Filed Jan. 7, 1969
[45] Patented Mar. 30, 1971

[54] APPARATUS FOR AND METHOD OF SEISMIC EXPLORATION
 4 Claims, 6 Drawing Figs.
[52] U.S. Cl. .................................................. 181/0.5, 340/7, 340/15.5
[51] Int. Cl. ................................................................ G01v 1/04
[50] Field of Search .......................................... 340/15.5 (MRC), 17, 8 (RT); 181/0.5C2, C4

[56] References Cited
 UNITED STATES PATENTS

| | | | |
|---|---|---|---|
| 2,307,792 | 1/1943 | Hoover.......................... | 340/17 |
| 2,772,746 | 12/1956 | Merten.......................... | 181/0.5 |
| 2,994,397 | 8/1961 | Huckabay ..................... | 181/0.5 |
| 3,041,578 | 6/1962 | Elliott............................ | 340/15.5 |
| 3,256,952 | 6/1966 | Crider et al.................... | 181/0.5 |

*Primary Examiner*—Rodney D. Bennett, Jr.
*Assistant Examiner*—Daniel C. Kaufman
*Attorney*—Charles E. Lightfoot ABSTRACT: Apparatus for use in seismic exploration comprising energy propogating means for directing energy downwardly vertically into an earth formation and means for receiving and recording such energy reflected vertically upwardly from a sub-surface bed or strata. The apparatus includes an energy source housing of generally dome shape adapted to be placed in a downwardly opening position on the bottom, and within which an energy source may be discharged to generate a vertically downwardly directed force against the sea floor, and a receptor or seismometer housing also of generally dome shape adapted to be similarly positioned on the sea bottom to receive vertically upwardly reflected energy from subsurface strata.

The invention also includes a method of seismic exploration which comprises propagating vertically downwardly directed energy at the earths surface and receiving and recording the vertically upwardly reflected energy from a subsurface formation, to provide information concerning the location and character of such formation.

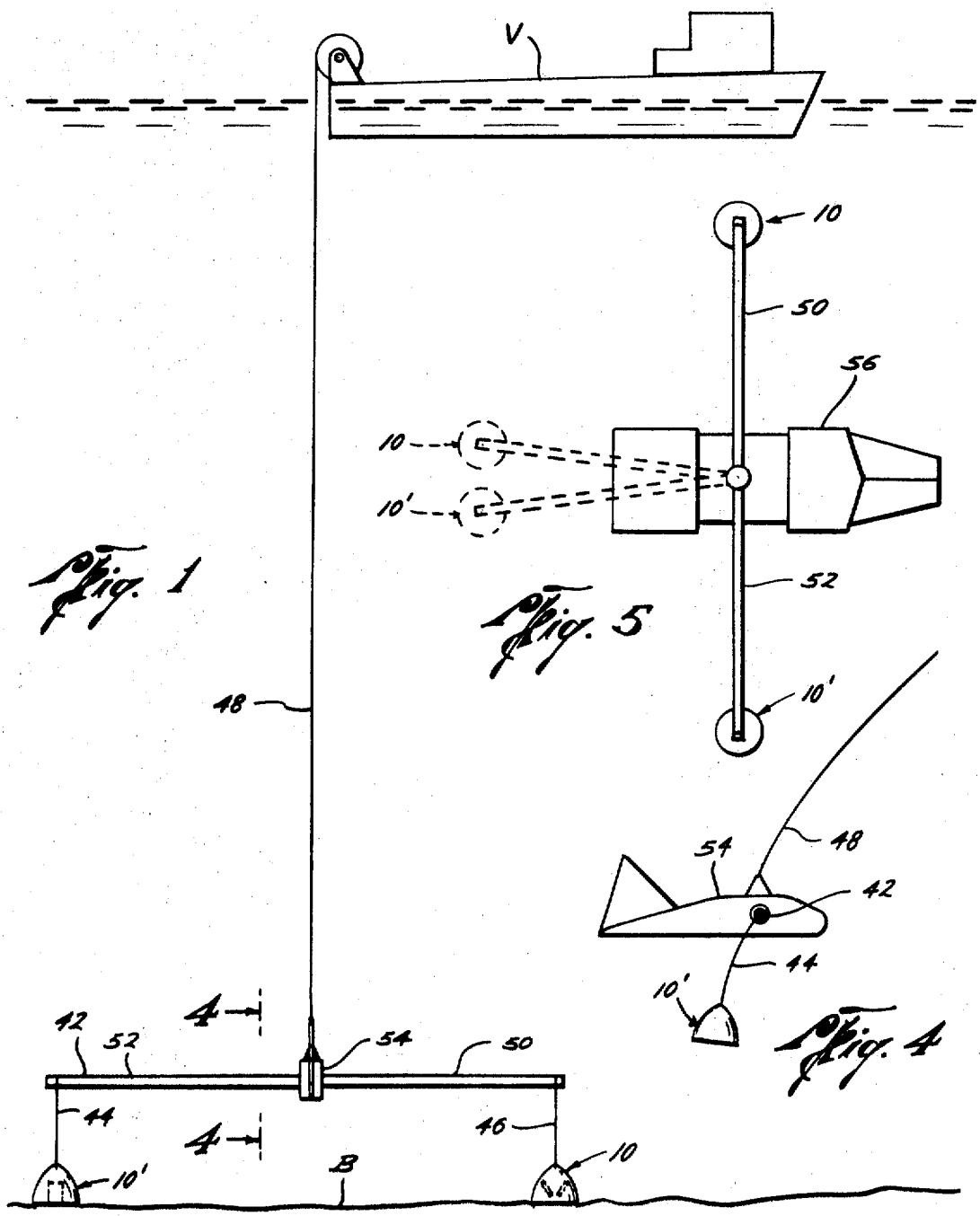

Patented March 30, 1971
3,572,462
3 Sheets-Sheet 2
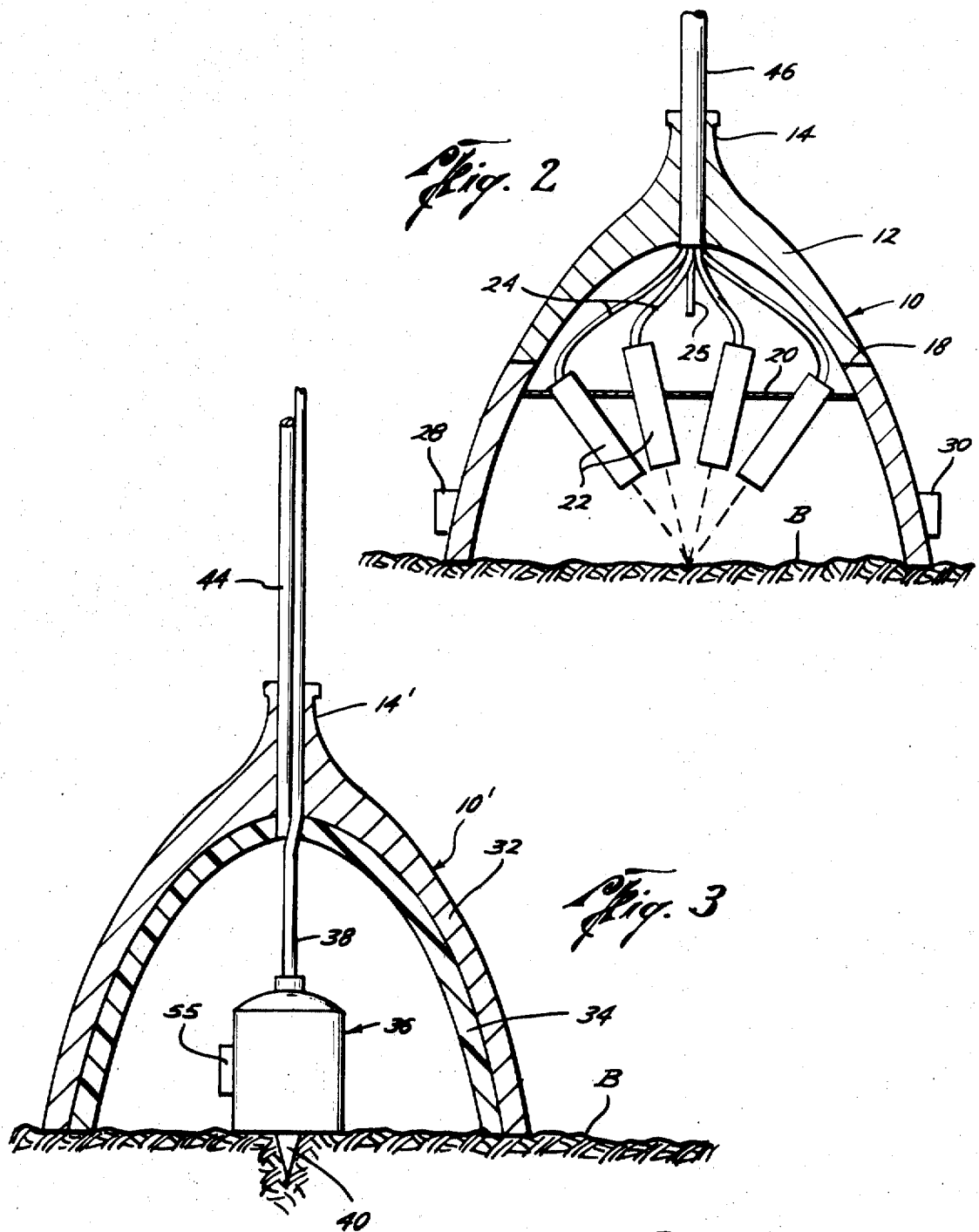
Joseph C. Gray
INVENTOR.
BY Charles E. Lightfoot
ATTORNEY

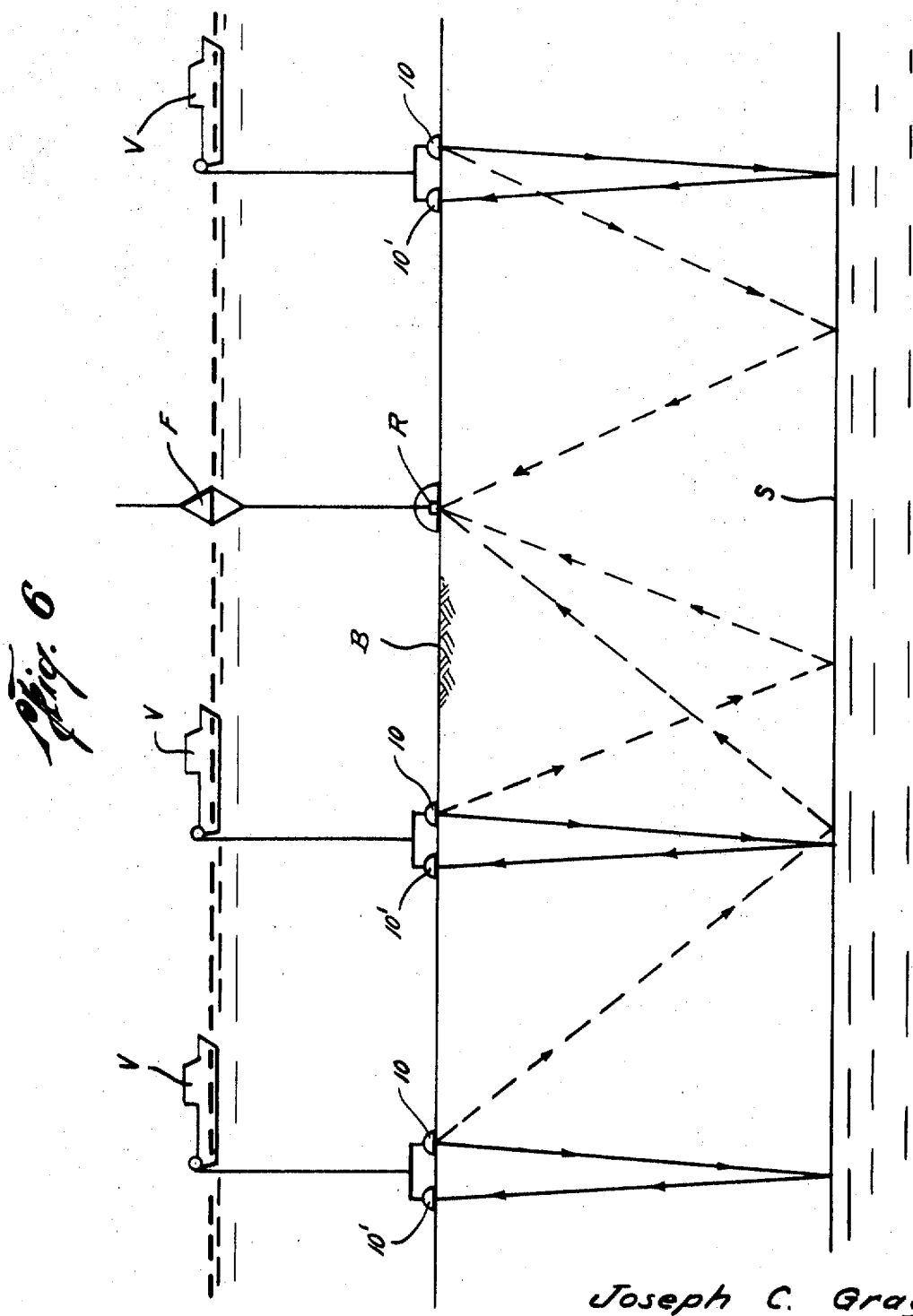

3,572,462

APPARATUS FOR AND METHOD OF SEISMIC EXPLORATION

BACKGROUND OF THE INVENTION

In carrying out seismic exploration operations it has long been customary to discharge explosives or to make use of energy sources of various other types at predetermined locations at the surface to impart a shock to the earth's crust and record the seismic waves reflected obliquely from the subsurface beds or strata interfaces by means of seismometers. The recorded data thus obtained are analyzed to provide information concerning the location and disposition of subterranean formations likely to contain petroliferous deposits or the like.

When seismic exploration operations of this kind are carried out on land, a number of receiving stations are usually employed at predetermined distances from a location at which an explosive charge is to be detonated and the time required for receiving the obliquely reflected energy from the explosion at each receiving station is recorded. From the known distances of the receiving stations from the discharge point and the time required to receive the seismic waves, it then becomes possible to determine the depth of the location of the reflecting interfaces or subsurface beds from which valuable information concerning the geological structure of such strata may be calculated.

Seismic exploration operations of this character are also extensively employed in submerged areas by towing an extended array of hydrophones behind a ship and discharging explosives and various other energy sources at predetermined intervals, the reflected energy at each hydrophone being similarly recorded. The construction and operation of such arrays in carrying out seismic explorations in submerged areas is complicated and subject to a number of serious disadvantages, in that the receptor array is very costly, cumbersome in operation and difficult to maintain at constant depth and linear position. Moreover, in carrying out the exploration in submerged areas in this manner there is a substantial loss of energy due to water damping and an undesirable reverbratory energy effect between the surface of the water and the sea floor, called "water bottom multiple."

Seismic exploration when carried out in the usual way is also subject to the complex multiple reflections from sedimentary strata, which generally mask desired reflected energy.

SUMMARY OF THE INVENTION

The present invention has for an important object the provision of an improved method of seismic exploration and apparatus therefor, by which the above difficulties may be avoided ro substantially reduced and whereby greater efficiency and economy may be effected in carrying out such operations.

Briefly described the invention comprises energy propagating mechanism and energy receptor means, each including a dome-shaped housing adapted to be positioned in a downwardly opening position on the earth's surface or sea floor, at closely spaced locations. The energy propagating mechanism may take the form of a gun of the pressure fluid type or other suitable energy propagating device located in one of the domes for generating and directing vertically downwardly an artificial shock wave to be reflected vertically upwardly from a subsurface formation, and the receptor means may take the form of a seismometer disposed in the other dome to receive and record the vertically upwardly reflected energy.

The method of the invention comprises the propagation of vertically downwardly directed energy at the earth's surface and the reception and recording of the energy which is reflected vertically upwardly from a subsurface formation, to provide information concerning the location and character of such formation. The method may also include the receiving and recording at a distance from the point of propagation of the energy at the surface of energy reflected from a subsurface formation, whereby information is located may be determined.

BRIEF DESCRIPTION OF THE VIEWS OF THE DRAWINGS

FIG. 1 is a front elevational view, on a greatly reduced scale, illustrating a preferred embodiment of the apparatus of the invention and showing the same as used in seismic exploration in a submerged area;

FIG. 2 is a vertical central, cross-sectional view of the gun or energy source unit of the apparatus of the invention;

FIG. 3 is a view, similar to that of FIG. 2 illustrating the receptor or seismometer housing unit of the apparatus;

FIG. 4 is a cross-sectional view, taken along the line 4—4 of FIG. 1, looking in the direction indicated by the arrows, and showing the manner in which the apparatus is maneuvered about in the water for positioning on the bottom;

FIG. 5 is a top plan view of the apparatus as applied to terrestrial operations; and FIG. 6 is a diagrammatic view, illustrating the manner in which the apparatus is used in carrying out seismic exploration operations in a submerged area, simultaneously recording production data and velocity information.

DETAILED DESCRIPTION OF A PARTICULAR EMBODIMENT OF THE INVENTION

Referring now to the drawings in greater detail, the seismic exploration apparatus of the invention includes an energy source of gun housing, generally designated 10, which may conveniently take the form of a rounded, open-bottomed, hollow body of bell-like, parabolic, or other suitable shape in cross section, which may be formed of any desired material having the requisite qualities of strength and resistance to shock, such as cast-iron.

The housing 10 has a suitable wall thickness and weight to withstand the shock to which it is subjected in use and to give sufficient weight to the apparatus to enable it to be readily moved about and accurately positioned upright at desired locations on the sea bottom.

At its lower end the housing 10 is open and shaped to rest upon the bottom in a submerged area, whereby the housing will be substantially completely closed and in contact with the bottom. The housing may be conveniently formed with an upper bell-shaped section 12, having a tubular neck portion 14 at its upper end, and a lower, generally annular section 16, which are suitably releasably fitted and secured together, as seen at 18 in FIG. 2, to permit the ready disassembly of the housing when desired.

Within the gun housing a transversely extending support or partition 20 is carried on the lower section 16, upon which one or more energy producing guns 22, such as air guns, or the like, are supported. Each of the guns is preferably connected by suitable means, such as a pressure tube or electrical conductor, as seen at 24, extending upwardly to the surface, by which the gun is activated or energized. Suitable means, such as a mercury relay or other transducer, designated 28, may be attached to the housing and suitably connected, in a usual manner to equipment at the surface for indicating when the housing is in a vertical position, and suitable depth indicating means, designated 30, of any well-known type, may be similarly located on the housing and connected to equipment at the surface to indicate the depth at which the housing is located.

A supply line 25 may also be provided, which opens into the housing 12, and through which fluid, such as air under pressure, may be introduced to pressurize the interior of the housing in order to permit the discharge of the guns 22 in a water and air environment. Suitable means, such as an adjustable pressure escape valve, not shown, is provided in the pressure supply line 25, to relieve the pressure in the housing, when the pressure therein exceeds a predetermined pressure.

The apparatus also includes a receptor or seismometer housing 10' of similar shape and size to that of the gun housing 10, and which may be formed of similar material. The receptor housing is preferably formed with an outer shell 32 in one piece, of strong, heavy material, such as cast-iron, within which a liner or cushion 34 is disposed, formed of suitable resilient material, such as plastic, sponge, polystyrene, or the like.

Within the receptor housing a seismometer, of any well-known type, generally designated 36, is suspended centrally, as by means of a cable 38, which may also contain electrical conductors by which the response of the seismometer to seismic energy may be recorded at the surface in a well-known manner.

The seismometer may also be provided with a mercury relay 55, or other suitable transducer means attached thereto to suitably indicate when the seismometer is in a vertical position.

The cable 38 passes upwardly through the neck 14' of the receptor housing and is located to permit the seismometer to occupy a centralized position in the housing.

The receptor housing 10' is suitably suspended from one end of a cross member or spreader 42, shown in FIG. 1, as by means of a cable 44, and the gun housing 10 similarly suspended from the other end thereof, as by means of a cable 46, the spreader being attached centrally thereof to a vessel V at the surface by an operating cable 48 adapted to be wound up and paid out to elevate and lower the apparatus. The cross member 42 may be formed with arms, such as those shown in FIG. 5 at 50 and 52, which are pivotally attached to a neutrally buoyant body or float 54 of suitable size and shape, as seen in FIG. 4, to maintain the spreader 42 and cables 44 and 46 in an elevated position about the housings 10 and 10' when the same are resting on the bottom.

In carrying out the method of the invention, making use of the above described apparatus, the gun housing and receptor housing are lowered in the water from the vessel V by means of the cable 48, to position the housings on the sea bottom, as seen in FIG. 1, the housings being maintained in spaced apart relation by the spreader 42. With the apparatus thus located the energy source is activated within the housing to direct a shock downwardly from the gun housing into the formation below. Due to the parabolic configuration of the metallic housing 10 the energy thus produced will be directed vertically downwardly from the bottom B to subterranean strata, such as that indicated at S, from which the energy is reflected vertically upwardly to the receptor housing 10', as seen in FIG. 6. The time between the discharging of the gun devices and the reception of the reflected energy by the receptor is suitably recorded by the usual instruments provided for this purpose on the vessel V.

The length of the spreader 42 as compared to the distance from the bottom B to the strata S from which the energy is reflected upwardly will be insufficient to cause any measurable deviation from the vertical between the downward path of the energy from the gun housing to the strata S and the upward path of the reflected energy.

By lifting the apparatus and moving it to a succession of new locations on the bottom any desired submerged area may be readily explored.

In lowering the apparatus to the bottom air under pressure may be introduced into the gun housing 10 to pressurize the same to form a cushion which will be sufficient to minimize the implosion or bubble effect resulting from expansion upon discharge of the gun device and the subsequent reduction in such expansion.

Upon an increase in the pressure in the housing 10 due to the discharging of the gun device or other source of energy, fluid under pressure may escape from the supply line 25 to relieve the pressure in the housing when such pressure exceeds a predetermined value.

In order to permit a determination of the depth of the strata S below the bottom, suitable seismometer equipment, such as that indicated at R in FIG. 6 may be placed on the bottom and controlled by a buoy F, or the like, at a predetermined location, whose distance from the vessel V may be accurately determined and the time required for reflected energy from the strata S to reach the seismometer attached to the buoy after the discharge of the gun devices is recorded, which may be transmitted automatically by radio to the vessel. From the relative positions of the gun housing 10 and the seismometer attached to the buoy, the depth of the strata S may then be readily calculated in a well-known manner.

The method of the invention comprises positioning an energy source and a seismometer substantially at the same point on the bottom of a submerged area, discharging the energy device to direct energy vertically downwardly to be reflected vertically upwardly from a subterranean earth formation and recording the reflected energy to determine the time between the downward discharge of the energy and the reception of the reflected energy to provide information concerning the character and location of the subterranean formation.

The method may also include the recording of the time required for energy from the source to reach a point located at a known distance on the surface from the energy source, to provide information concerning the depth of the reflecting strata below the surface.

The apparatus and method of the invention may also be used for seismic exploration on land by suitably mounting the equipment to be moved about on a truck or other suitable vehicle 56, shown in FIG. 5. The method on land is carried out in a similar manner to that carried out under water, the operation of the apparatus and recording of the results being conducted in the same way and by the same equipment. The housings 10 and 10' may conveniently be carried on elongated arms 50 and 52, respectively, pivotally attached to the vehicle to permit the same to be moved to retracted positions, as shown in dash lines in FIG. 5 for convenience in moving the equipment about.

In positioning the housing 10 and 10' on land a rim or seal of suitable plastic material, such as heavy mud, may be placed on the ground in contact with the lower end portions of the housings to close the same and to provide uniform contact between the housings and the ground entirely about the peripheries of the housings.

It will thus be seen that the invention provides a method of seismic exploration as well as apparatus for carrying out the same, by which the transmission to and reception of energy from the formation being explored takes place along the normal path, rather than an oblique path, whereby the efficiency and accuracy of the information obtained is greatly enhanced.

The invention is disclosed herein in connection with a particular embodiment of the apparatus and a certain method of procedure, which are intended by way of illustration only, it being evident that various changes may be made in the structure and arrangement of the parts of the apparatus, as well as in the particular procedure followed, within the spirit of the invention and the scope of the appended claims.

I claim:

1. Seismic exploration apparatus comprising a pair of generally dome-shaped housings adapted to be positioned in downwardly opening, juxtaposed relation on the Earth's surface, means in one of said housings positioned to propagate energy to be directed vertically downwardly therefrom toward subsurface formations, means in the other of said housings for receiving and recording energy reflected vertically upwardly from such a subsurface formation, means for holding said housings in fixed relation to each other, and means for simultaneously raising and lowering the housings.

2. The seismic exploration apparatus as claimed in claim 1, wherein said raising and lowering means includes cable means for supporting said housings from an overhead support.

3. The seismic exploration apparatus as claimed in claim 1, including buoyant means connected to said housings to yieldingly resist downward movement of the housings in water.

4. The seismic exploration apparatus as claimed in claim 1, including additionally means for introducing gas under pressure into said one of said housings above the lower end of the same to form a compressible body of gas in said one housing above the water entering the lower end thereof when said one housing is lowered in the water, and means for allowing the escape of such gas from said one housing when the pressure therein exceeds a predetermined pressure.